US012654138B2

(12) United States Patent <br> Jiang et al.

(10) Patent No.: US 12,654,138 B2 <br> (45) Date of Patent: Jun. 16, 2026

(54) PREPARATION METHOD OF JANUS CERAMIC MEMBRANE AND APPLICATION OF JANUS CERAMIC MEMBRANE IN DISPERSION-INTENSIFIED BUBBLE AERATION PROCESS

(71) Applicant: NANJING TECH UNIVERSITY, Nanjing (CN)

(72) Inventors: Hong Jiang, Nanjing (CN); Meng Zhao, Nanjing (CN); Jiuxuan Zhang, Nanjing (CN); Rizhi Chen, Nanjing (CN); Weihong Xing, Nanjing (CN)

(73) Assignee: NANJING TECH UNIVERSITY, Nanjing (CN)

( * ) Notice: Subject to any disclaimer, the term of this patent is extended or adjusted under 35 U.S.C. 154(b) by 0 days.

(21) Appl. No.: 18/998,134

(22) PCT Filed: Aug. 3, 2022

(86) PCT No.: PCT/CN2022/109903 <br> § 371 (c)(1), <br> (2) Date: Jan. 24, 2025

(87) PCT Pub. No.: WO2024/021145 <br> PCT Pub. Date: Feb. 1, 2024

(65) Prior Publication Data <br> US 2025/0262599 A1 Aug. 21, 2025

(30) Foreign Application Priority Data

Jul. 26, 2022 (CN) .......................... 202210885011.7

(51) Int. Cl. <br> B01D 69/02 (2006.01) <br> B01D 67/00 (2006.01)

(52) U.S. Cl. <br> CPC ......... B01D 69/02 (2013.01); B01D 67/0088 (2013.01); B01D 2325/022 (2013.01); B01D 2325/0283 (2022.08); B01D 2325/36 (2013.01); B01D 2325/38 (2013.01)

(58) Field of Classification Search <br> None <br> See application file for complete search history.

(56) References Cited

U.S. PATENT DOCUMENTS

2018/0118957 A1 * 5/2018 Brown .................. C09D 5/1693 <br>
2018/0345227 A1 12/2018 Lin et al. <br>
2019/0054426 A1 2/2019 Darling et al.

FOREIGN PATENT DOCUMENTS

| CN | 106474947 A | | 3/2017 | |
| CN | 108722207 A | * | 11/2018 | ............. B01D 71/68 |
| CN | 108947572 A | | 12/2018 | |
| CN | 109482131 A | | 3/2019 | |
| CN | 109705393 A | * | 5/2019 | |
| CN | 107519768 B | * | 7/2019 | ................ C02F 1/44 |
| CN | 209411910 U | * | 9/2019 | |
| CN | 110643277 A | * | 1/2020 | ............. C09D 5/08 |
| CN | 110755887 A | | 2/2020 | |
| CN | 111440784 A | | 7/2020 | |
| CN | 111744369 A | | 10/2020 | |
| CN | 212262924 U | * | 1/2021 | |
| CN | 113144903 A | | 7/2021 | |
| CN | 113522053 A | | 10/2021 | |
| CN | 113731199 A | | 12/2021 | |

OTHER PUBLICATIONS

Huang et al. (Environ. Sci. Technol. 2017, 51, 13304-13310) "Novel Janus Membrane for Membrane Distillation with Simultaneous Fouling and Wetting Resistance" (Year: 2017).* <br>
Qiufang Cui, et al., Hydrophobic-Hydrophilic Janus Ceramic Membrane for Enhancing the Waste Heat Recovery from the Stripped Gas in the Carbon Capture Process, ACS Sustainable Chem. Eng., 2022, pp. 3817-3828, vol. 10.

* cited by examiner

*Primary Examiner* — Ryan B Huang

(74) *Attorney, Agent, or Firm* — Bayramoglu Law Offices LLC

(57) ABSTRACT

Provided are a use of a Janus ceramic membrane in a dispersion-intensified bubble aeration process, and a preparation method of the Janus ceramic membrane. The Janus ceramic membrane is prepared as follows: a hydrophobic group is in situ grafted on a $Al_2O_3$ ceramic membrane as a substrate membrane through impregnation of a perfluoroalkylsilane (FAS) to prepare a hydrophobic ceramic membrane, and then a hydrophilic coating polydopamine (PDA) is formed through unilateral asymmetric surface deposition of dopamine (DA) to produce the Janus ceramic membrane for bubble aeration. The Janus ceramic membrane has asymmetric wettability. The Janus ceramic membrane not only has the unique properties of both hydrophilic and hydrophobic ceramic membranes, but also can improve the defects of hydrophilic and hydrophobic ceramic membranes to allow a synergistic effect, which improves the bubble aeration performance of the membrane in a gas-liquid dispersion process.

5 Claims, 16 Drawing Sheets

Wavenumber (cm⁻¹)

PREPARATION METHOD OF JANUS CERAMIC MEMBRANE AND APPLICATION OF JANUS CERAMIC MEMBRANE IN DISPERSION-INTENSIFIED BUBBLE AERATION PROCESS

CROSS REFERENCE TO THE RELATED APPLICATIONS

This application is the national phase entry of International Application No. PCT/CN2022/109903, filed on Aug. 3, 2022, which is based upon and claims priority to Chinese Patent Application No. 202210885011.7, filed on Jul. 26, 2022, the entire contents of which are incorporated herein by reference.

TECHNICAL FIELD

The present disclosure belongs to the technical field of applications of ceramic membranes, and relates to a use of a Janus ceramic membrane in a dispersion-intensified bubble aeration process, and a preparation method of the Janus ceramic membrane.

BACKGROUND

Microbubbles have been widely used in energy production, environmental remediation, aquaculture, chemicals, petrochemicals, etc., such as biofuel cells, biodiesel refineries, wastewater treatment, natural gas deodorization, and carbon dioxide capture from flue gases. During the bubble aeration of these related industries, the size of bubbles and the speed of bubble aeration have significant impacts on the efficiency of the gas-liquid mass transfer and the whole production process. Microbubbles can increase the gas-liquid contact area and prolong the residence time of bubbles in a solution, thereby effectively promoting the gas-liquid mass transfer. Therefore, how to efficiently acquire microbubbles meeting the production requirements has become a key issue in these industries. Currently, the methods widely used in the industry to produce microbubbles mainly include sonication, electrolysis, pressurized dissolved air flotation, dispersion with microfluidic devices, etc. These methods have disadvantages such as difficult control of operating conditions, high energy consumption, and poor dispersion effects. In recent years, the membrane dispersion technology has attracted extensive attention due to advantages such as controllability, energy conservation, and high efficiency. In this technology, a porous membrane material is adopted as a "chip," and under the action of pressure, a gas-phase material is dispersed into a large number of microbubbles through micro-nano pores. The research and development on this technology is currently focused on the control of a pore size of a porous membrane material and a gas flow. The size of bubbles essentially depends on the adhesion and buoyancy of a gas/solid interface, rather than a pore size of a porous membrane material. Thus, when the size of bubbles is required to be smaller than the gas/solid contact area, it is difficult to further reduce the size of bubbles by reducing a pore size of a membrane material. Moreover, the surface wettability of the membrane material significantly affects the detachment of bubbles. A hydrophilic membrane, namely, a "super-aerophobic surface," has a large contact angle with underwater bubbles and is a surface with low bubble adhesion, which is conducive to the rapid detachment of bubbles from orifices. However, the bubble aeration directly with a hydrophilic membrane is disadvantageous because the water can penetrate into pores of the membrane to cause a sharp rise in gas inlet pressure. There is currently no report on a method to well solve the contradiction between a detachment speed of bubbles and a gas pressure, and the emergence of Janus membranes makes it possible to solve this technical problem.

Most of the current Janus membranes are made of organic materials with high porosity. The weak bonding caused by the separation and overlapping of individual fibers makes these membranes have a poor mechanical strength and be prone to degradation or swelling. Therefore, Janus membranes with both chemical stability and thermal stability are in great demand in the industry. Compared with organic membranes, hydrophilic ceramic membranes are prepared with an inorganic material as a matrix and have a special micro-nano structure. As a result, the hydrophilic ceramic membranes have advantages such as long-term stability at high temperatures; excellent chemical stability to acids, alkalis, and solvents; mechanical stability under high pressure; and long service life, which provide an opportunity for the application of hydrophilic ceramic membranes in the harsh environment of chemicals. Therefore, the design and preparation of a Janus membrane based on a porous hydrophilic ceramic membrane to disperse a gas reactant is expected to acquire a microbubble dispersion system with prominent stability, high uniformity, and fine size, which can enhance the mixing process and interphase mass transfer and reduce the gas inlet pressure to ensure the efficient, energy-saving, and stable proceed of a reaction process. However, there is currently no literature report on the combination of a Janus ceramic membrane with bubble aeration to achieve the enhanced gas-liquid mass transfer.

SUMMARY

In view of the problems existing in the gas-liquid mass transfer process, the present disclosure provides a use of a novel Janus ceramic membrane in a dispersion-intensified bubble aeration process, and a preparation method of the Janus ceramic membrane.

In order to achieve the above objective, the present disclosure adopts the following technical solutions:

A hydrophobic group is grafted in situ on a $Al_2O_3$ ceramic membrane as a substrate membrane through impregnation of a perfluoroalkylsilane (FAS) to prepare a hydrophobic ceramic membrane, and then a hydrophilic coating polydopamine (PDA) is formed through unilateral asymmetric surface deposition of dopamine (DA) to produce the Janus ceramic membrane for bubble aeration.

A preparation process of the Janus ceramic membrane is as follows:

step 1, pretreatment of a substrate membrane: cleaning the substrate membrane in cleaning solutions, and drying it in an oven labeled CM for later use;

step 2, preparing a solution A for later use with FAS as a solute and cyclohexane as a solvent;

step 3, impregnating the CM produced after the pretreatment in the solution A for a specified period of time, taking out, rinsing ungrafted FAS on a surface off with cleaning solutions, and drying a resulting membrane in an oven to produce a hydrophobic ceramic membrane named CM-FAS for later use;

step 4, adding DA as a solute to deionized water as a solvent, and adjusting a PH of a resulting solution with a Tris-HCl buffer to about 8.5 (8.4 to 8.6) to prepare a solution B for later use; and step 5, placing a single side of the CM-FAS in the solution B to allow deposition for a specified period of time (or coating the solution B evenly on a single side of the hydrophobic ceramic membrane), taking a resulting membrane out, cleaning, and drying in an oven to produce the Janus ceramic membrane named CM-PDA for later use.

Preferably, in the step 1, the substrate membrane is a fresh $Al_2O_3$ ceramic membrane with a nano-scale pore size, a diameter of 3 cm, and a thickness of 2 mm. In the step 1, the cleaning solutions are ethanol, acetone, and distilled water, respectively, and the pretreatment refers to ultrasonic cleaning for 5 min to 15 min in each cleaning solution; and the drying after the pretreatment is conducted at 60° C. to 80° C. for 8 h to 16 h.

Preferably, in the step 2, the solute FAS is any one of perfluoro-n-hexyltrimethoxysilane, perfluoro-n-octyltrimethoxysilane, and perfluorododecyltrimethoxysilane, and a concentration of the solution A is 0.005 mol/L.

Preferably, in the step 3, the CM is impregnated in the solution A for 3 h, the cleaning solutions are ethanol, acetone, and distilled water, respectively, the rinsing refers to continuous rinsing for 5 min to 15 min, and the drying in the oven is conducted at 60° C. to 80° C. for 4 h to 8 h.

Preferably, in the step 4, a concentration of the DA in the solution B is 1 g/L to 6 g/L.

Preferably, in the step 5, the CM-FAS is placed in the solution B in a three-point support manner: the hydrophobic ceramic membrane is placed in a glass dish with three points fixed, and the single side of the hydrophobic ceramic membrane is allowed to contact the solution B for 0.5 h to 10 h; the cleaning refers to rinsing with deionized water for 5 min to 15 min; and the drying in the oven is conducted at 60° C. to 80° C. for 8 h to 16 h.

The bubble aeration process is to disperse a gas-phase substance in a liquid phase through the Janus ceramic membrane; the Janus ceramic membrane has a sheet structure, and two sides of the sheet structure are a hydrophilic surface and a hydrophobic surface, respectively; and the hydrophilic surface is in contact with the liquid phase, and the hydrophobic surface is in contact with the gas phase.

In order to observe a bubble aeration effect, the following device (as shown in FIG. 1) is designed: A visualization window and a bubble aeration membrane are seal-assembled, a gas pipeline is connected, and a high-speed camera, the visualization window, and a surface light source are arranged on a same optical path. A specified volume of a transparent solution is added to the visualization window, the surface light source is turned on, and a gas inlet valve is opened to introduce a gas. Bubbles passing through the bubble aeration membrane are observed in situ by the high-speed camera. The high-speed camera has a frame rate of at least 1,000 fps, pixels of at least 720×720 pixels², an aperture value of no more than 22, and a tilt angle of no more than 12°, and a position of the high-speed camera should allow the photographing of clear and complete bubbles. In the present disclosure, 500 mL of static deionized water is adopted as a liquid phase, and compressed air is adopted as a dispersed phase. The bubble aeration membrane is fixed by a flange, with the hydrophilic surface facing upwards to contact the liquid-phase water and the hydrophobic surface facing downwards to contact the air. A gas inlet pressure is controlled by adjusting a pressure reducing valve of a compressed air cylinder, such that the gas can overcome the transmembrane resistance and pass through the bubble aeration membrane to enter the liquid-phase water. A gas flow rate is adjusted with a rotameter to 0.05 L/min to 0.3 L/min.

A pressure is adjusted, and a gas inlet pressure is recorded. The high-speed camera is debugged and then used for photographing. A captured video is uploaded to a data acquisition system.

In the present disclosure, a hydrophobic group is in situ grafted to prepare a hydrophobic ceramic membrane, and then a hydrophilic coating is deposited through unilateral asymmetric surface deposition of DA to produce the Janus ceramic membrane. The Janus ceramic membrane with asymmetric wettability not only has the unique properties of both hydrophilic and hydrophobic ceramic membranes, but also can improve the defects of hydrophilic and hydrophobic ceramic membranes to allow a synergistic effect, which improves the bubble aeration performance of the membrane in a gas-liquid dispersion process. Compared with the original hydrophilic ceramic membrane, the hydrophobic side of the Janus ceramic membrane can prevent water from penetrating into pores of the membrane and reduce the mass transfer resistance. Compared with the hydrophobic ceramic membrane, the hydrophilic surface not only is conducive to the generation of ultra-fine bubbles, but also can allow the rapid separation of bubbles from a surface of the membrane and improve the mass transfer efficiency. The concentration of DA and the unilateral deposition time have great impacts on the performance of the Janus ceramic membrane. When a concentration of the DA solution is 4 g/L and the unilateral deposition time is 1.5 h during the preparation process, the Janus ceramic membrane prepared accordingly exhibits the optimal performance. In the air-deionized water two-phase system, a gas inlet pressure is 0.02 Mpa, which is ten times lower than a gas inlet pressure of the hydrophilic ceramic membrane. Moreover, an average size of bubbles passing through the Janus ceramic membrane is about 154 μm, and a dissolved oxygen concentration in the aqueous phase within 3 min is 7.9 mg/L, indicating better mass transfer performance than the hydrophilic ceramic membrane.

Compared with the prior art, the present disclosure has the following advantages and positive effects:

1. The present disclosure proposes a use of a Janus ceramic membrane with asymmetric wettability in bubble aeration, and provides a new idea for the enhanced gas-liquid mass transfer.

2. In the present disclosure, a hydrophobic group is first grafted in situ through a reaction of FAS with hydroxyl on a surface of a ceramic membrane to prepare a hydrophobic ceramic membrane, and then a hydrophilic coating is formed through unilateral asymmetric deposition of DA to prepare a Janus ceramic membrane with asymmetric wettability. Therefore, the present disclosure provides a method for quickly and effectively preparing a Janus ceramic membrane.

3. While allowing the production of microbubbles in a gas-liquid two-phase system, the prepared Janus ceramic membrane can reduce the working pressure and energy consumption and lead to excellent mass transfer performance, which provides a new way for fields such as dissolution and mass transfer of gases in liquid phases, gas-liquid phase reactions, and microbubble generation.

4. The Janus ceramic membrane prepared by the present disclosure has excellent stability, strong adaptability, and a long replacement cycle, which is suitable for industrial application and promotion.

5. The present disclosure provides a theoretical basis for the design and preparation of novel membrane materials for gas dispersion.

DETAILED DESCRIPTION OF THE EMBODIMENTS

To make the objective, features, and advantages of the present disclosure clearly understood, the present disclosure will be further described below with reference to specific examples. It should be noted that the examples of the present application and the features in the examples may be combined with each other in a non-conflicting situation.

In the following description, many specific details are set forth to facilitate full understanding of the present disclosure, but the present disclosure can also be implemented in other ways other than those described herein. Therefore, the present disclosure is not limited by the specific examples disclosed in the following specification.

Example 1

(1) Pretreatment of CM

The CM was ultrasonically cleaned for 5 min in ethanol, acetone, and distilled water successively, and then dried in an oven at 60° C. for 8 h to produce pretreated CM.

(2) Preparation of CM-FAS

A solution of 0.005 mol/L tridecafluoro-n-octyltrimethoxysilane in cyclohexane was prepared. Then the pretreated CM was impregnated with the solution of tridecafluoro-n-octyltrimethoxysilane in cyclohexane for 3 h, then taken out, rinsed with ethanol, acetone, and distilled water continuously for 5 min, and then dried in an oven at 60° C. for 4 h to produce CM-FAS.

(3) Preparation of CM-PDA

A 4 g/L DA aqueous solution was prepared, and a pH of the DA aqueous solution was adjusted with a Tris-HCl buffer to about 8.5. Then the prepared CM-FAS was immersed in the DA aqueous solution with one side immersed and the other side exposed to allow deposition for 1.5 h, then taken out, rinsed with deionized water continuously for 5 min, and then dried in a 60° C. oven for 8 h to produce CM-PDA, where a depth for the immersing was not limited.

(4) Measurement of Surface Chemical States and Surface Wetting States of CM, CM-FAS, and CM-PDA Surface chemical compositions of CM, CM-FAS, and CM-PDA were measured by Fourier transform infrared spectroscopy (FTIR) and XPS. Water contact angles and underwater air contact angles of CM, CM-FAS, and CM-PDA were measured by a contact angle measuring instrument.

Other operations not specifically stated in this example all were normal operations.

The CM, CM-FAS, and CM-PDA each were subjected to bubble aeration performance comparison.

Figure 1:
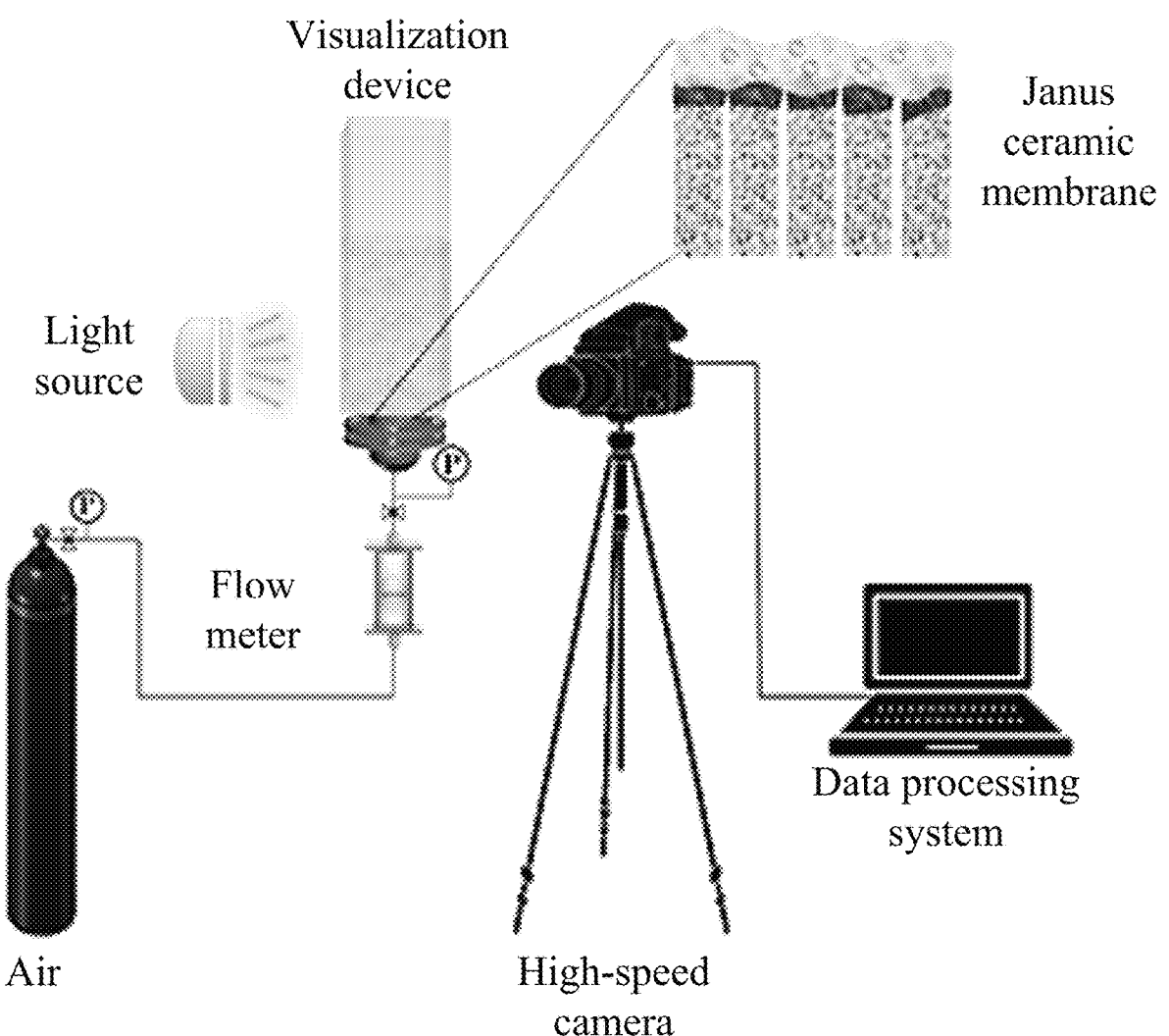
FIG. 1 shows an experimental apparatus for using a Janus ceramic membrane in a gas-liquid dispersion process.

The apparatus shown in FIG. 1 was adopted. A visualization window and the CM-PDA were seal-assembled. The bubble aeration membrane was fixed by a flange with a hydrophilic surface facing upwards to contact liquid-phase water and a hydrophobic surface facing downwards to contact air. A gas pipeline was connected. A high-speed camera, the visualization window, and a surface light source were arranged on a same optical path. 500 mL of deionized water was added to the visualization window, the surface light source was turned on, and a pressure valve of a compressed air cylinder was opened. A pressure reducing valve was adjusted to control a gas inlet pressure. When there were small bubbles escaping from a solution, a gas inlet pressure was recorded. The high-speed camera was debugged for photographing, and a captured video was uploaded to a data acquisition system. Bubbles were subjected to size and distribution processing with Phantom Camera Control (PCC) to obtain an average size and distribution of bubbles passing through the CM-PDA. Then, a gas flow rate was adjusted with a rotameter to 0.05 L/min, 0.075 L/min, 0.1 L/min, 0.125 L/min, 0.15 L/min, 0.175 L/min, 0.2 L/min, 0.225 L/min, 0.25 L/min, 0.275 L/min, and 0.3 L/min, and a change of a gas inlet pressure with a gas flow rate was recorded. The apparatus was disassembled, the membrane was replaced, and the visualization window and the CM were seal-assembled. The same experimental process as above was conducted. The apparatus was disassembled, the membrane was replaced, and the visualization window and the CM-FAS were seal-assembled. The same experimental process as above was conducted.

The apparatus was disassembled, the visualization window and the CM-PDA were seal-assembled, and the pressure reducing valve was adjusted. Under a gas working pressure of 0.2 MPa, a dissolved oxygen concentration in deionized water was automatically recorded by a dissolved oxygen meter every 5 s to determine a change of the dissolved oxygen concentration over time within 180 s.

The apparatus was disassembled, the visualization window and the CM-PDA were seal-assembled, and the pressure reducing valve was adjusted. Under a gas inlet pressure, videos of bubbles passing through the CM-PDA at 0 h, 2 h, 4 h, 6 h, 8 h, 10 h, 12 h, 18 h, and 24 h were captured with the high-speed camera.

Figure 2:
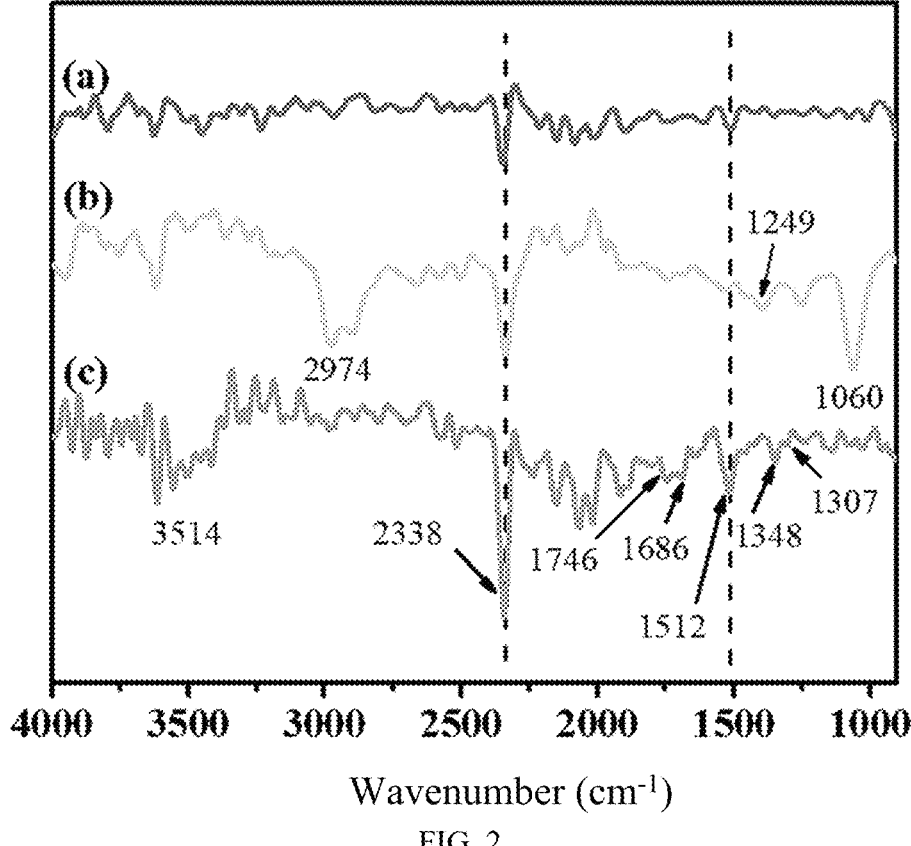
FIG. 2 shows infrared spectra of CM, CM-FAS, and CM-PDA prepared under the optimal conditions.

As shown in FIG. 2, surface chemical structures of the original CM (a), the CM-FAS (b), and the CM-PDA (c) were determined by FTIR. In the FAS in situ grafting reaction, hydroxyl on a surface of CM reacted with methoxy of FAS to make the perfluoro-monomer grafted on CM, such that the surface free energy of the membrane was reduced. Compared with a spectrum of the original CM, in a spectrum of CM-FAS, a tensile vibration of $CF^3$ appeared at 1,246 $cm^{-1}$, a bending vibration of Si—O appeared at 1,060 $cm^{-1}$, and an absorption peak at around 2,974 $cm^{-1}$ was caused by a stretching vibration of methylene (—$CH^2$). After the unilateral asymmetric deposition of DA, a characteristic spectral band of CM-FAS was completely covered in a spectrum of CM-PDA. A thickness of the coating was considered to be close to a probing depth of FTIR, and was about a few microns. An O—H stretching vibration in an aromatic ring appeared at 3,514 $cm^{-1}$, and an adsorption peak at 1,686 $cm^{-1}$ was caused by the overlap of C—C resonance vibrations and N—H bending in an aromatic ring. An N—H shearing vibration of amido was observed at 1,512 $cm^{-1}$, and C—O—H bending and a stretching vibration of phenolic hydroxyl were appeared at 1,348 $cm^{-1}$ and 1,307 $cm^{-1}$, respectively, indicating the successful deposition of PDA on the surface of CM.

Figure 3:
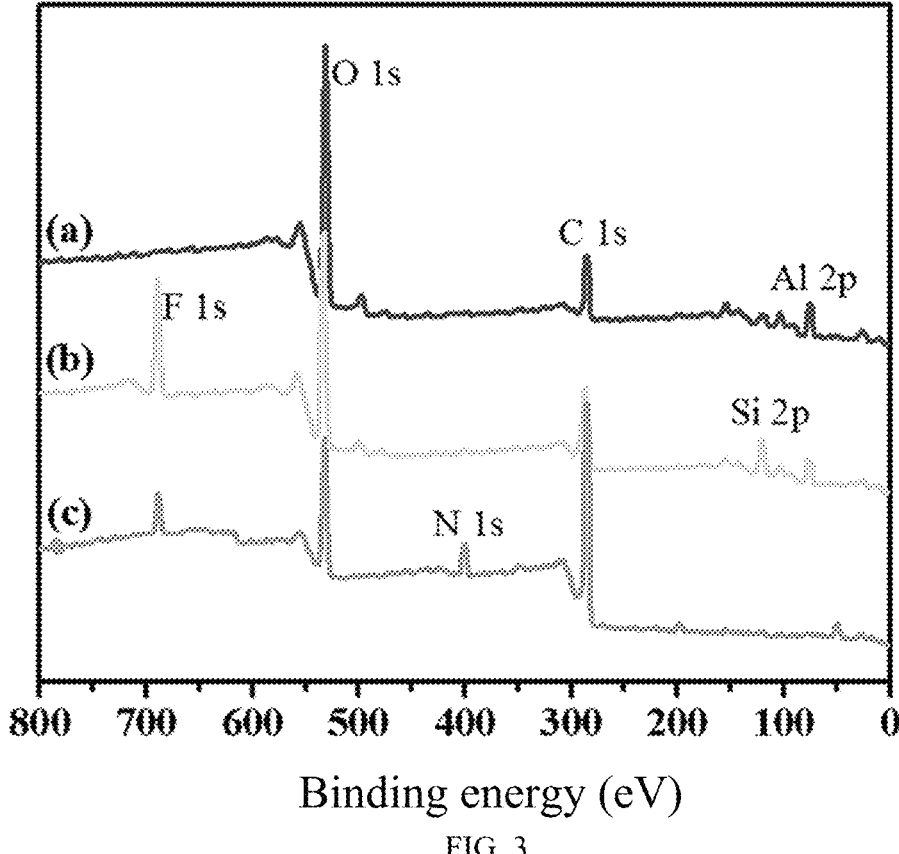
FIG. 3 shows X-ray photoelectron spectroscopy (XPS) spectra of CM, CM-FAS, and CM-PDA prepared under the optimal conditions.

As shown in FIG. 3, the surface chemical compositions of the original CM (a), the CM-FAS (b), and the CM-PDA (c) were further confirmed by XPS. A broad spectrum of the original CM indicated three peak components: C1s, O1s, and Al2p. After the FAS in situ grafting reaction, a F1s peak and a Si2p peak appeared at about 399 eV in a broad spectrum of CM-FAS, and thus it could be inferred that FAS was successfully grafted on CM. Moreover, intensities of the C1s, O1s, and Al2p peaks decreased, and thus the surface free energy of CM-FAS was greatly reduced. After the unilateral asymmetric deposition of DA, an intensity of the C1s peak was significantly enhanced, and the F1s peak was weakened. Moreover, a N1s peak appeared at about 399 eV, and thus the presence of PDA on a surface of CM-PDA could be inferred, indicating that PDA was successfully coated on a surface of CM-FAS.

Figure 4:
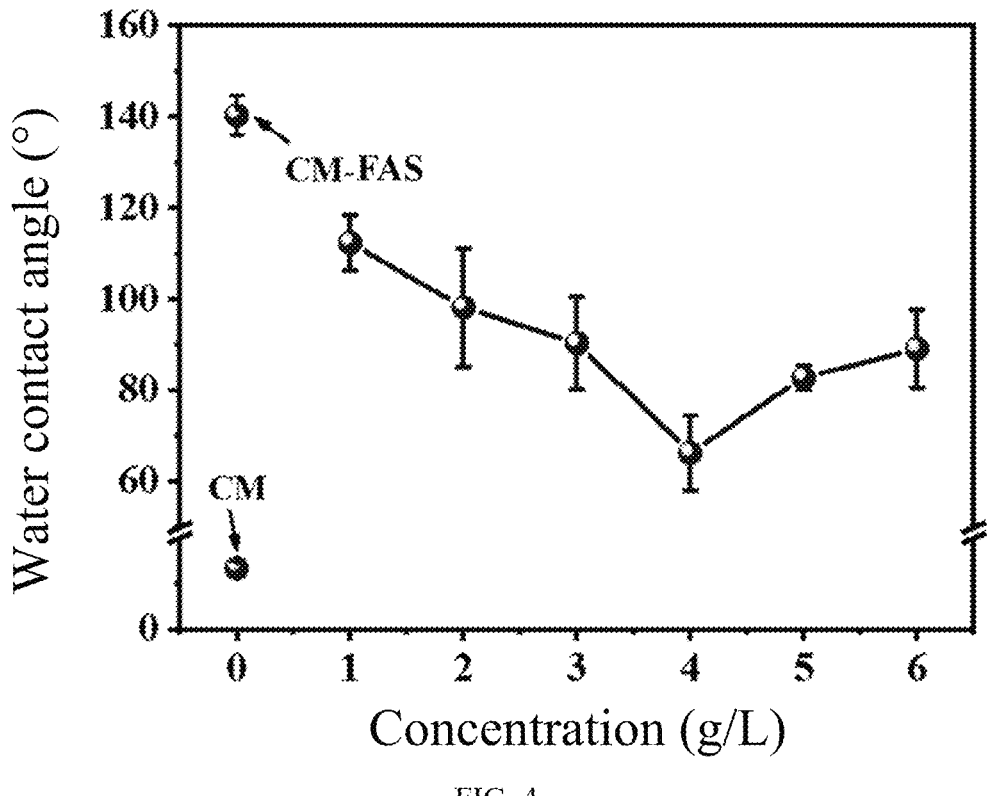
FIG. 4 shows water contact angles of CM and CM-FAS and an impact of a DA concentration on a water contact angle of CM-PDA.
Figure 5:
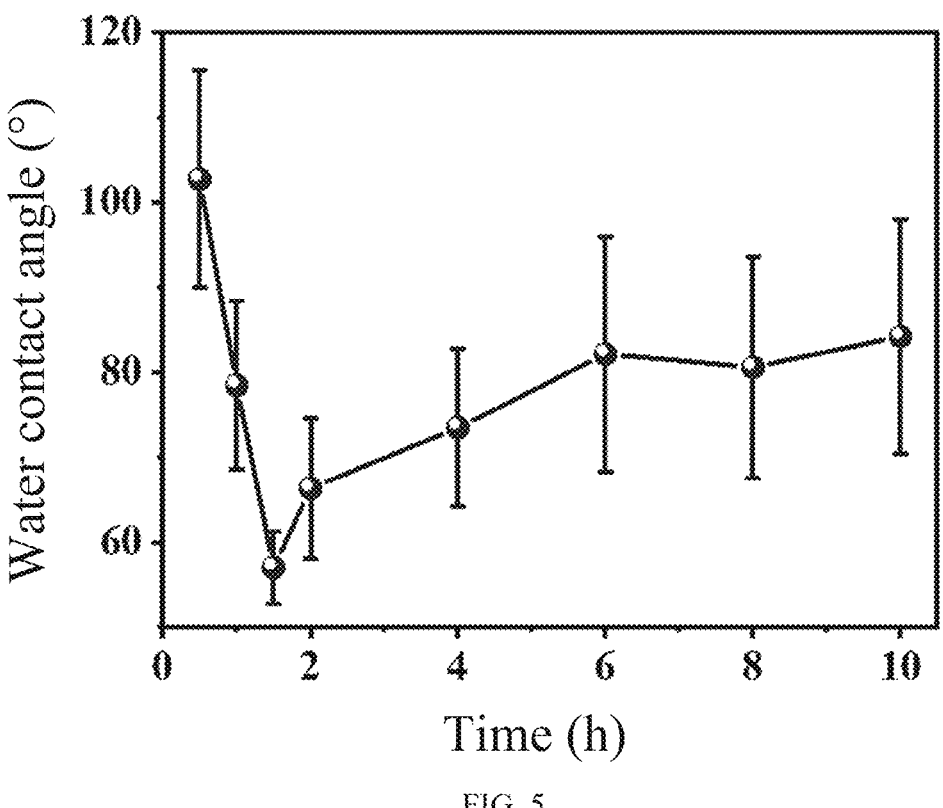
FIG. 5 shows an impact of a deposition time on a water contact angle of CM-PDA.

FIG. 4 and FIG. 5 show water contact angles of CM and CM-FAS and impacts of a DA concentration and a deposition time on a water contact angle of CM-PDA. According to the results, compared with the original CM, a water contact angle of CM-FAS increased from about 13° to about 145°, which was attributed to the following reason: On the one hand, the hydroxyl in the original CM was bonded with the methoxy in the FAS to form an O—Si bond. On the other hand, the $CF^3$ group in the FAS had a non-polar end, which increased the hydrophobicity. Compared with CM-FAS, a water contact angle of CM-PDA was significantly reduced, which was attributed to the following reason: There were a large number of hydrophilic groups in a PDA molecule, such as amino and phenolic hydroxyl. Thus, after a surface of the membrane was covered with the PDA coating, the hydrophilicity was significantly improved. However, with the increase of a DA concentration, the water contact angle of CM-PDA decreased first and then increased. When the DA concentration was 4 g/L, the water contact angle reached the minimum of 68°. However, when the DA concentration further increased, the water contact angle was not further reduced, which was attributed to the fact that the generation of large PDA aggregates caused the uneven growth of the PDA coating and thus led to the uneven surface wettability of CM-PDA. With the increase of a deposition time of 4 g/L DA, the water contact angle of CM-PDA also decreased first and then increased. When the deposition time was 1.5 h, the water contact angle decreased to 58°. A too-long deposition time would still lead to the generation of large PDA aggregates.

Figures 6A, 6B, 6C, 6D:
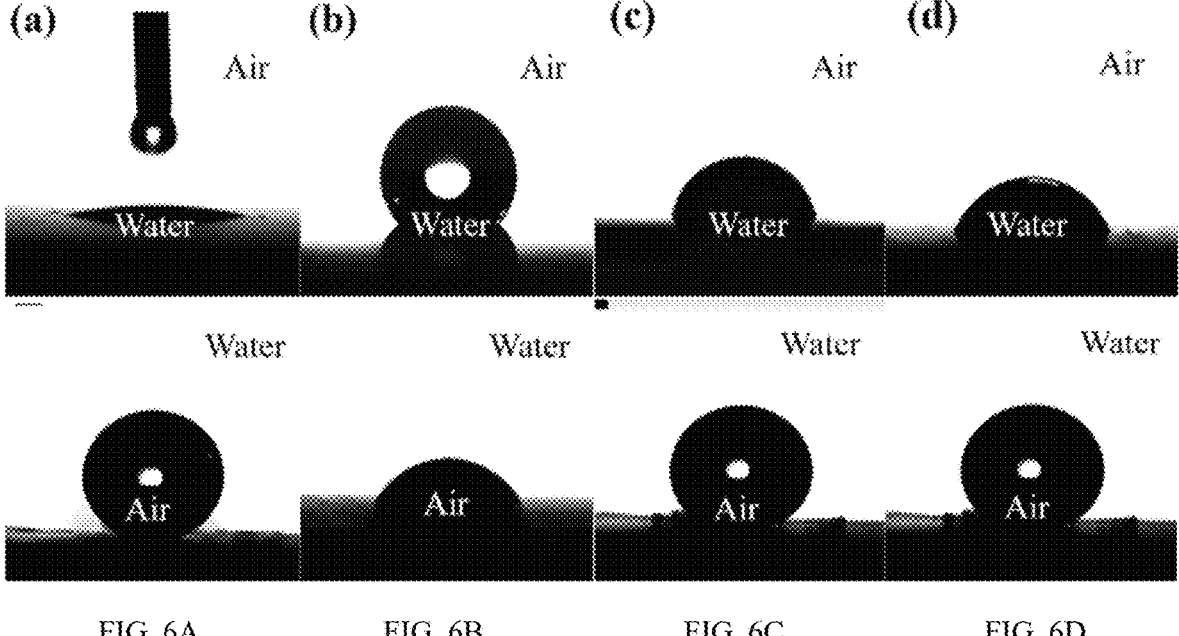
FIGS. 6A-6D show underwater air contact angles of CM, CM-FAS, and CM-PDA prepared with the optimal DA concentration and deposition time.

FIGS. 6A-6D show underwater air contact angles of CM, CM-FAS, and CM-PDA prepared with the optimal DA concentration and deposition time. As shown in FIG. 6A for CM, water droplets were dispersed after contacting a surface of the membrane, which was attributed to a porous structure and a free hydroxyl binding action on the surface of the membrane. However, the underwater performance was as follows: bubbles were stable on a surface of CM, and an underwater air contact angle was 160°, indicating underwater super-aerophobicity. After the FAS treatment, as shown in FIG. 6B, underwater bubbles were spread on a surface of CM-FAS, and an underwater air contact angle was 50°. For CM-PDA prepared through the deposition of 4 g/L DA for 2 h, as shown in FIG. 6C, a side of CM-PDA that was not modified with DA had the same wettability as CM-FAS, and at a side of CM-PDA that was modified with DA, underwater bubbles were stably located on a surface and an underwater air contact angle was 150°. When the deposition time was further reduced to 1.5 h, as shown in FIG. 6D, an underwater air contact angle of CM-PDA was also stabilized at about 150°, indicating that the DA-modified side had similar underwater super-aerophobicity to CM.

Figure 7:
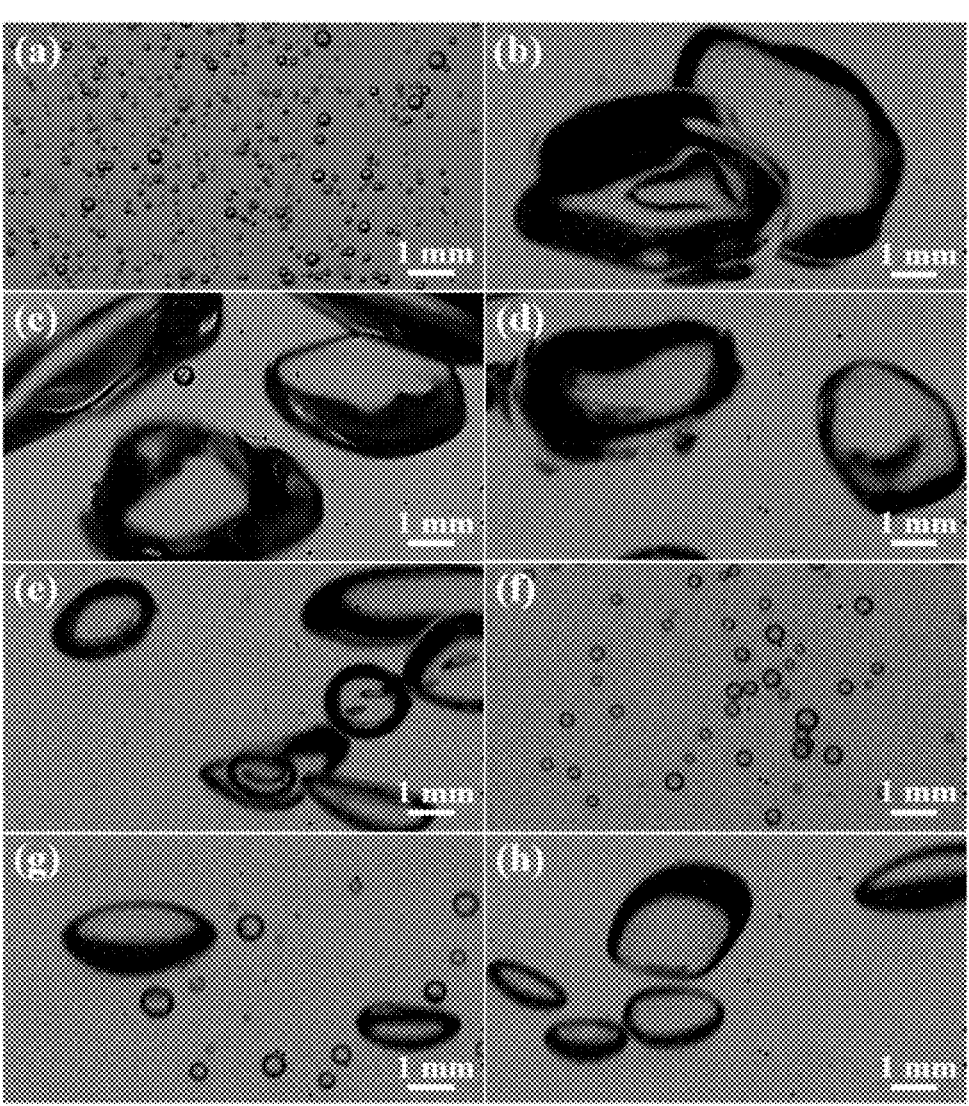
FIG. 7 shows bubble aeration pictures of CM, CM-FAS, and CM-PDAs prepared at different DA concentrations.
Figure 8:
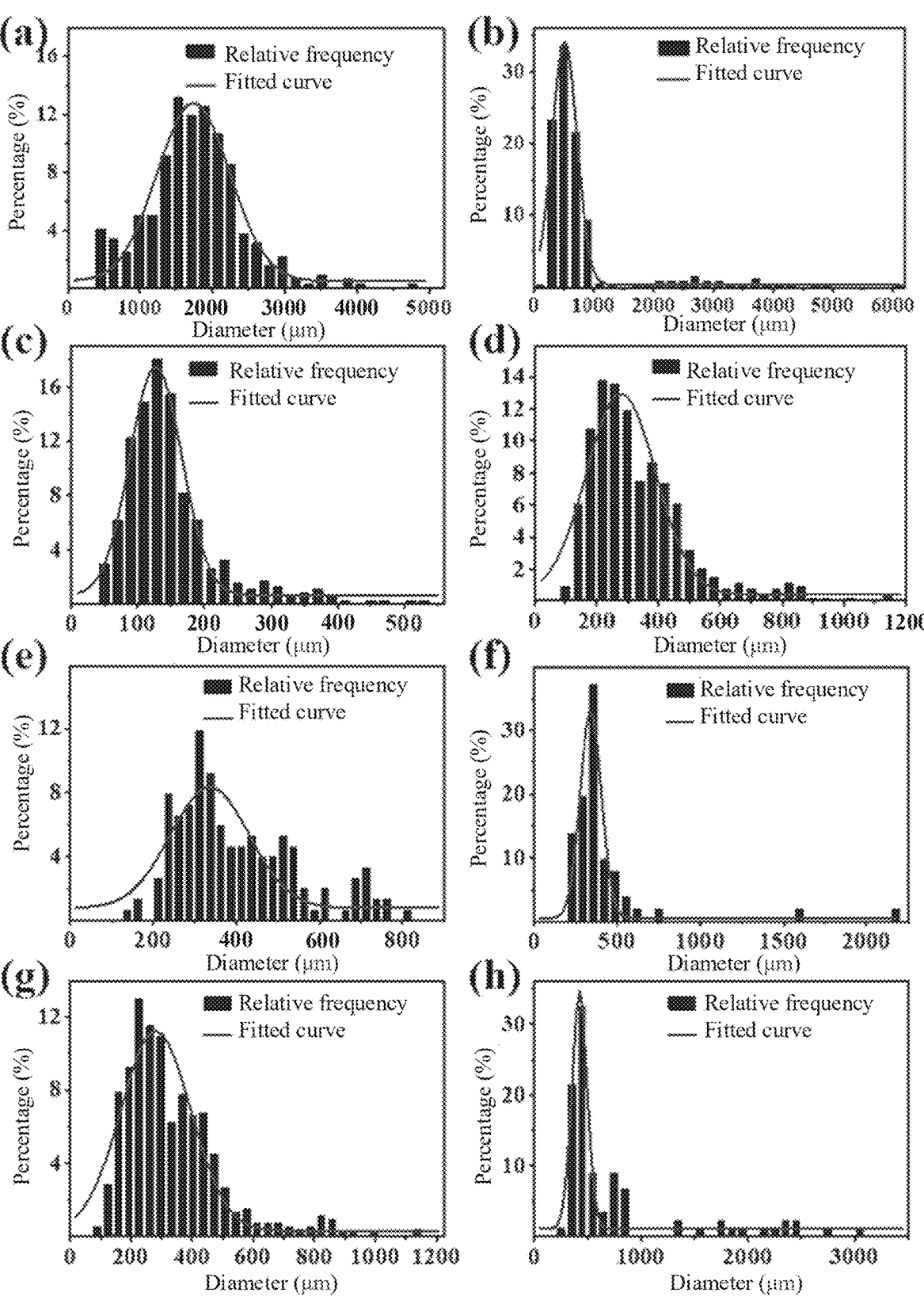
FIG. 8 shows bubble size distributions of CM, CM-FAS, and CM-PDAs prepared at different DA concentrations.
Figure 9:
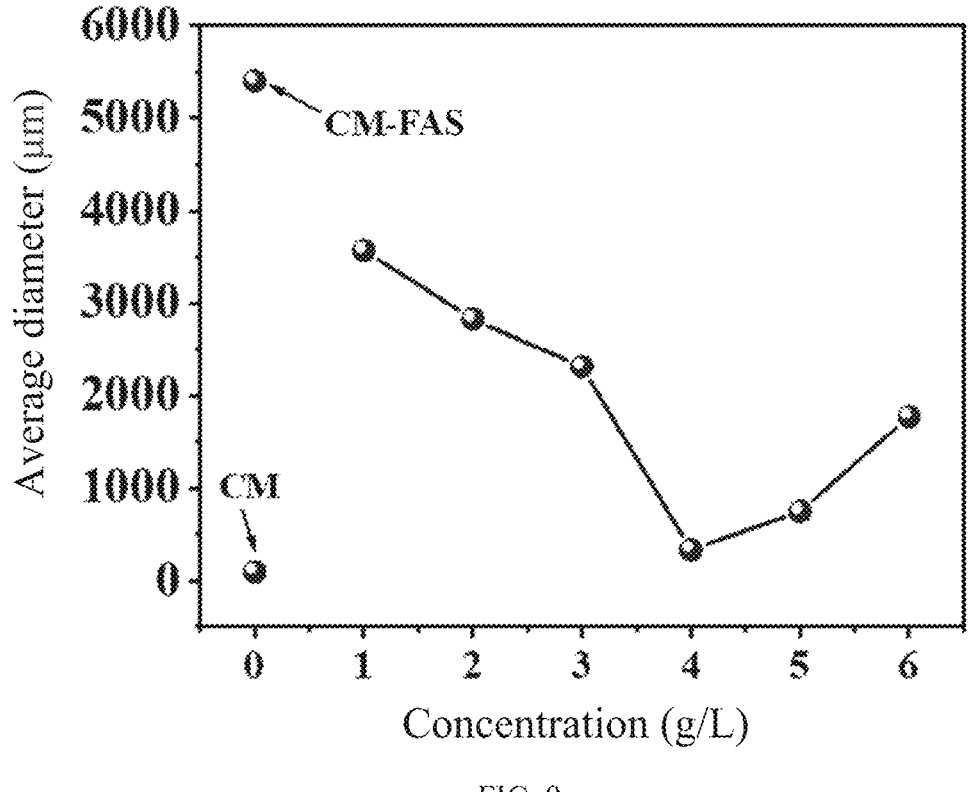
FIG. 9 shows average bubble sizes of CM, CM-FAS, and CM-PDAs prepared at different DA concentrations.

FIG. 7 to FIG. 9 show the bubble aeration performance of CM, CM-FAS, and CM-PDAs prepared at different DA concentrations. According to the results, a size of bubbles passing through CM-PDA was much smaller than a size of bubbles of about 5,405.2 μm passing through CM-FAS. With the increase of a DA concentration, an average size of bubbles generated decreased first and then increased. Bubbles passing through CM-PDA prepared at 4 g/L had a minimum size of about 335.1 μm. This is because a size of bubbles was affected by a wetting state of a surface. Therefore, the optimal DA concentration for preparing CM-PDA was 4 g/L.

Figure 10:
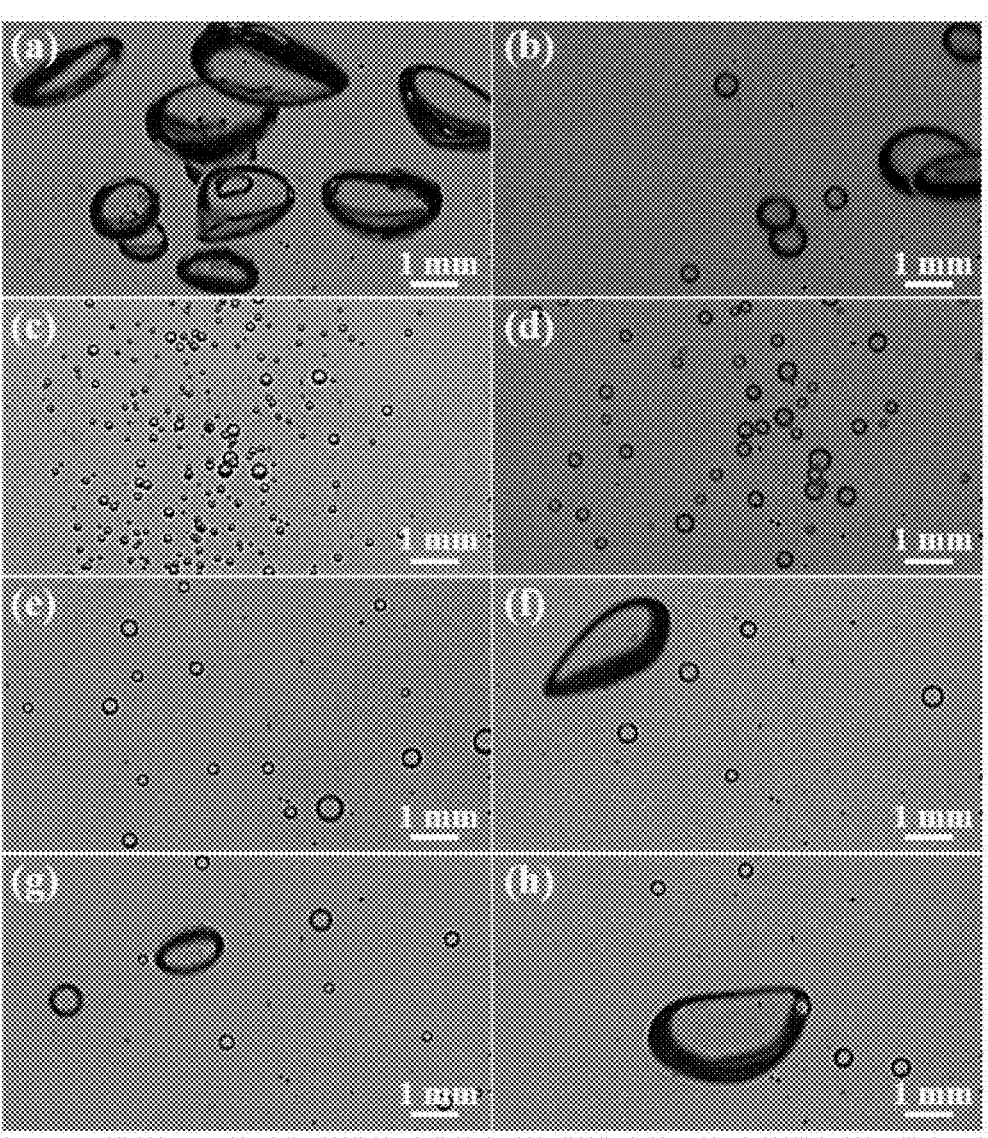
FIG. 10 shows bubble aeration effects of CM-PDAs prepared with different deposition times.
Figure 11:
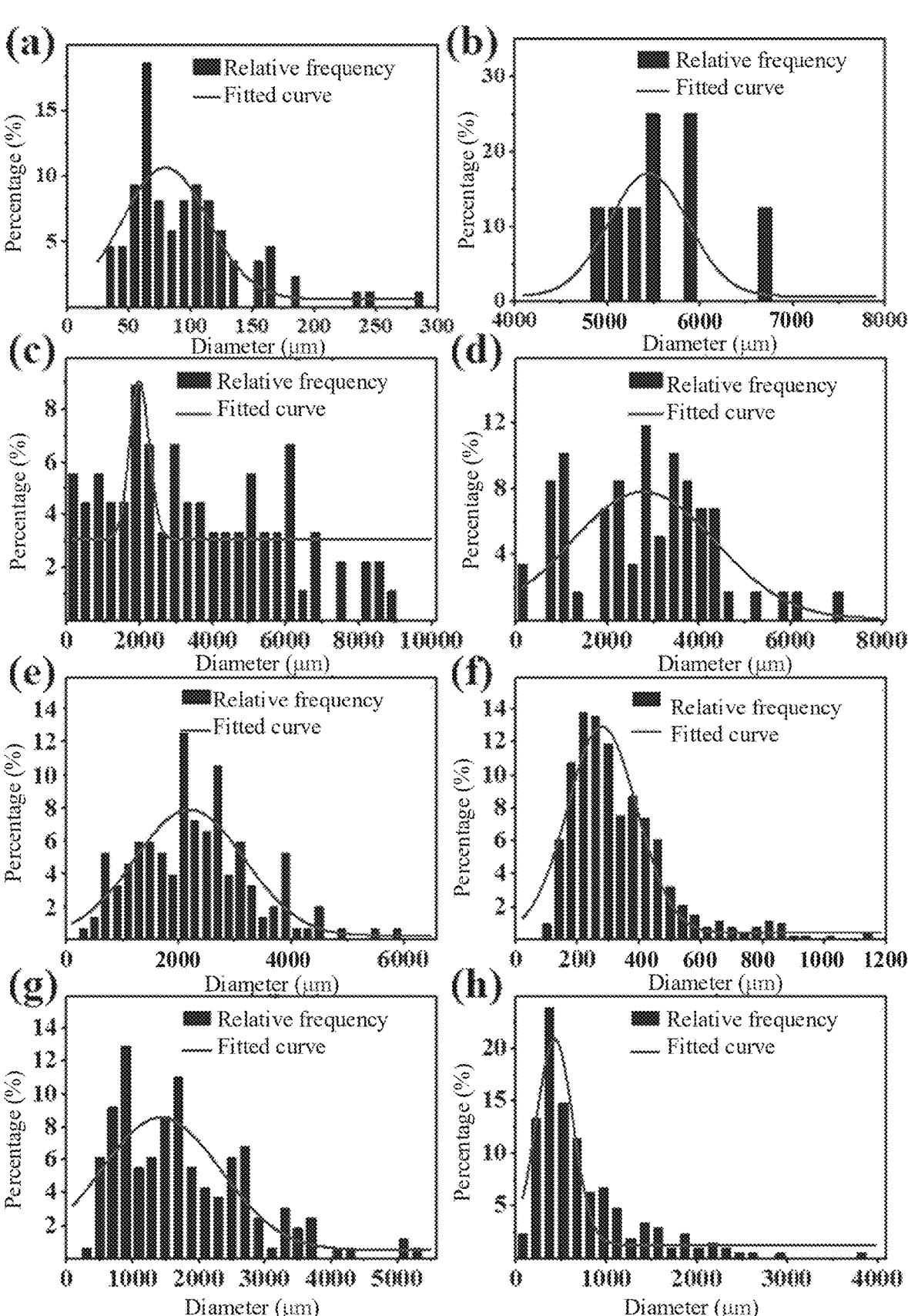
FIG. 11 shows bubble size distributions of CM-PDAs prepared with different deposition times.
Figure 12:
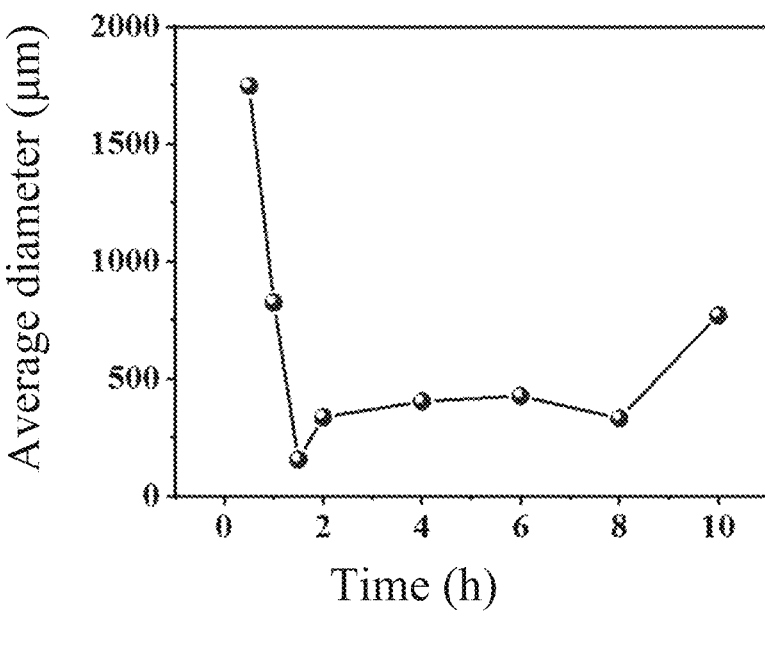
FIG. 12 shows an impact of a deposition time on an average bubble size of CM-PDA.

FIG. 10 to FIG. 12 show the bubble aeration performance of CM-PDAs prepared with different deposition times. According to the results, compared with CM-PDA prepared through the deposition of 4 g/L DA for 2 h, bubbles generated by CM-PDA prepared through the deposition of 4 g/L DA for 1.5 h had a size further reduced to about 154.1 μm, but were still larger than bubbles of about 97.8 μm passing through CM. This is because the surface wettability of CM-PDA prepared through the deposition of 4 g/L DA for 1.5 h was further enhanced compared with CM-PDA prepared through the deposition for 2 h, but was still weaker than the surface wettability of CM. Therefore, for the preparation of CM-PDA, the optimal DA concentration was 4 g/L and the optimal deposition time was 1.5 h.

Figure 13:
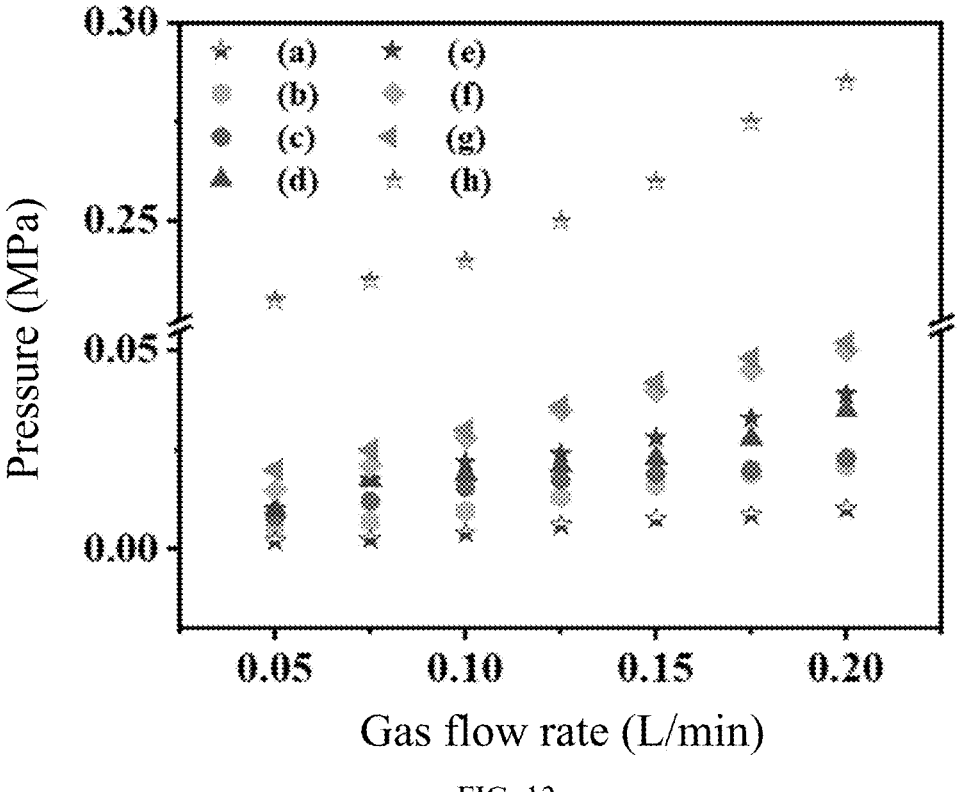
FIG. 13 shows changes of gas inlet pressures of CM, CM-FAS, and CM-PDAs prepared at different DA concentrations with a gas flow rate.
Figure 14:
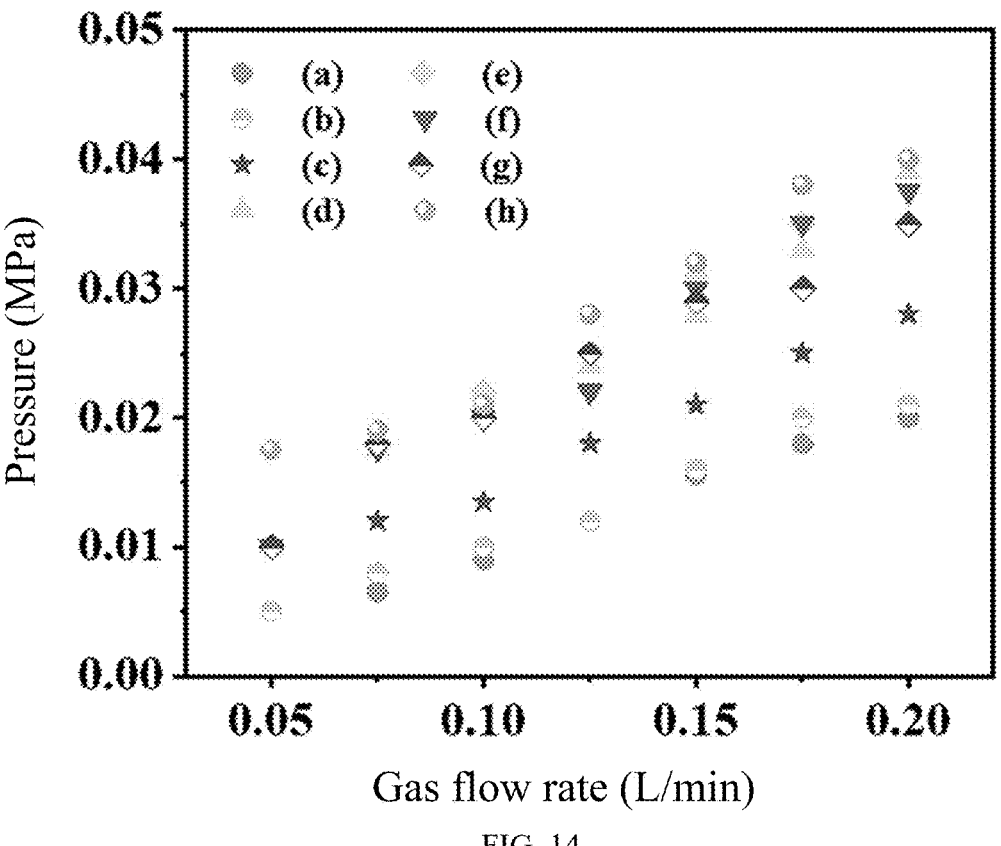
FIG. 14 shows changes of gas inlet pressures of CM-PDAs prepared under different deposition times with a gas flow rate.

FIG. 13 to FIG. 14 show changes of gas inlet pressures of CM, CM-FAS, and CM-PDAs prepared under different DA concentrations and deposition times with a gas flow rate. According to the results, inlet pressures of the three membranes all gradually increased with the increase of a flow rate. Compared with CM (0.2 MPa) (FIG. 13 (*a*)), CM-PDA significantly reduced the gas inlet pressure (0.02 MPa) (FIG. 13 (*b* to *g*) and FIG. 14 (*a* to *h*)). However, a gas inlet pressure of CM-PDA was always greater than a gas inlet pressure of CM-FAS (0.01 MPa) (FIG. 13 (*h*)) because the hydrophobic membrane facilitated the penetration of a gas into pores of the membrane. This result was reasonable because a hydrostatic pressure was the only resistance to prevent bubbles from passing through CM-FAS. The hydrophilic PDA layer on a surface of CM-PDA made the Laplace pressure significant, which increased the energy consumption. Therefore, the use of CM-PDA can improve the bubbling efficiency and reduce the energy consumption.

Figure 15:
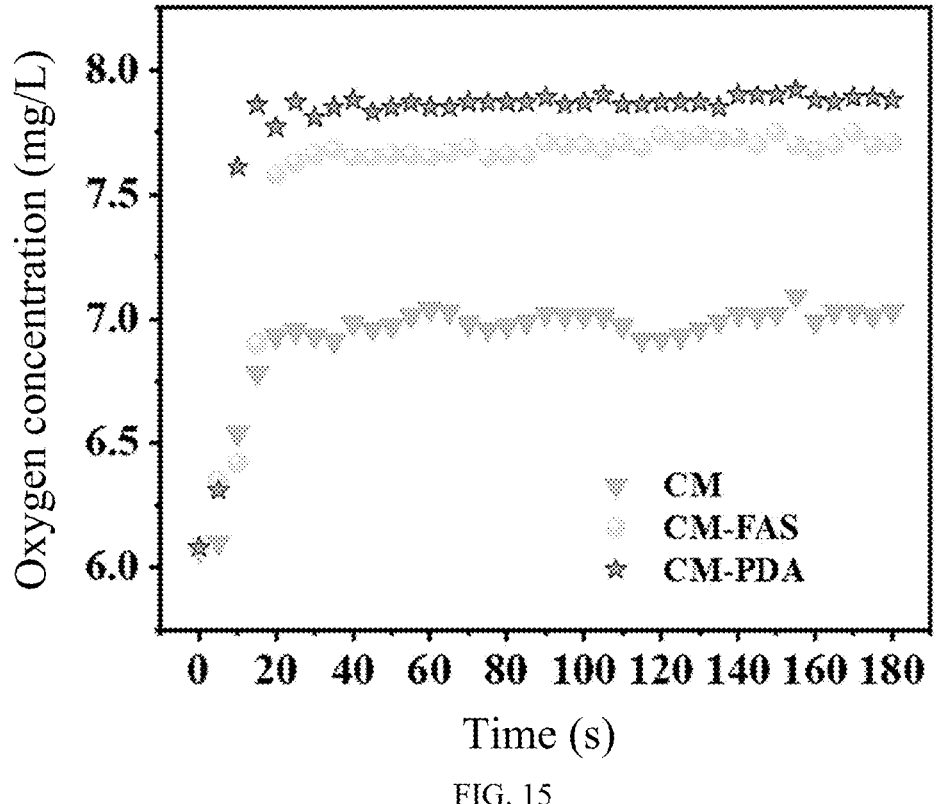
FIG. 15 shows changes of dissolved oxygen concentrations in water over time when CM, CM-FAS, and CM-PDA prepared under the optimal conditions are adopted as bubble aeration membranes.

As shown in FIG. 15, a dissolved oxygen concentration in an aqueous solution within a specified period of time was detected by a dissolved oxygen meter to determine the mass transfer efficiency for CM, CM-FAS, and CM-PDAs prepared under the optimal conditions. According to the results, under a pressure of 0.2 MPa and within 180 s, compared with the original CM, dissolved oxygen concentrations of CM-FAS and CM-PDA-4-1.5 increased from 7.01 mg/L to 7.72 mg/L and 7.98 mg/L, respectively. This is because gas flow rates of CM-FAS and CM-PDA were high at 0.2 MPa. A dissolved oxygen concentration of CM-PDA was higher than a dissolved oxygen concentration of CM-FAS. This is because bubbles generated by CM-PDA at 0.2 MPa had a small size, a large gas-liquid interface, and a large contact time. Therefore, CM-PDA is conducive to a bubble aeration process.

Figure 16:
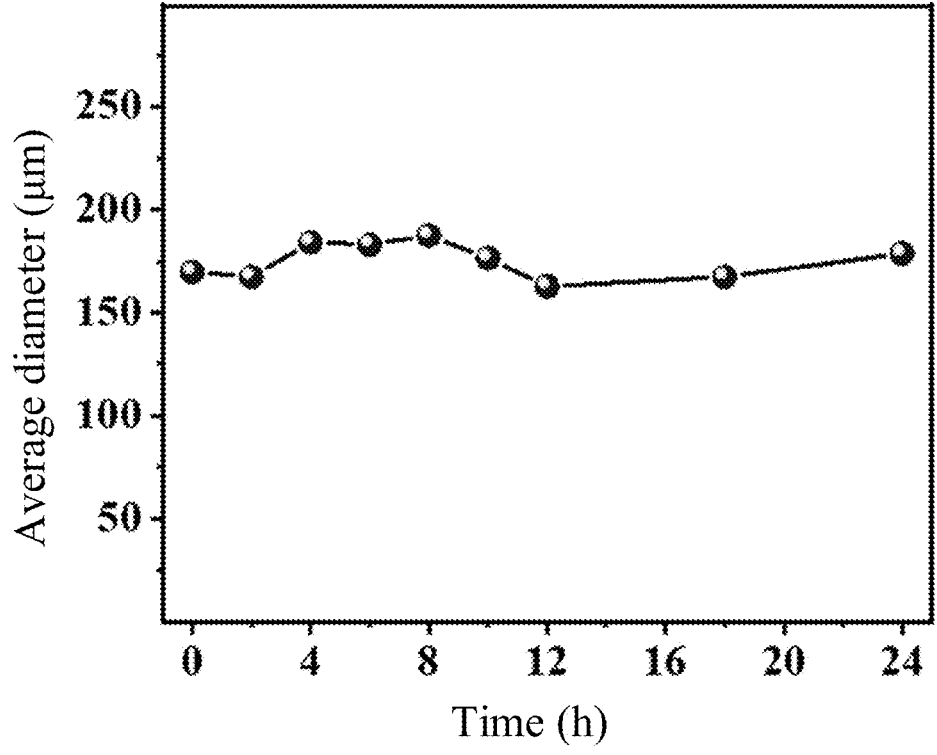
FIG. 16 shows a change of an average bubble size of CM-PDA prepared under the optimal conditions over time.

As shown in FIG. 16, the stability of CM-PDA was investigated by detecting a change in an average size of bubbles generated by CM-PDA during a long-term bubble aeration experiment. According to the results, after 24 h of continuous bubble aeration at 0.02 MPa, an average size of bubbles generated by CM-PDA prepared under the optimal conditions was stabilized at about 160 μm. Therefore, the PDA coating had stable performance.

As mentioned above, the CM-PDA was used in a membrane-dispersed air-water system. A gas inlet pressure was 0.02 Mpa, which was ten times lower than a gas inlet pressure of the hydrophilic CM. Bubbles passing through CM-PDA had an average size of about 151.1 μm, and the bubbles were small. A dissolved oxygen concentration in an aqueous phase within 3 min was 7.98 mg/L, which was better than a dissolved oxygen concentration of the original hydrophilic CM.

Example 2

(1) Pretreatment of CM

The CM was ultrasonically cleaned for 10 min in ethanol, acetone, and distilled water successively, and then dried in an oven at 70° C. for 12 h to produce pretreated CM.

(2) Preparation of CM-FAS

A solution of 0.005 mol/L perfluoro-n-hexyltrimethoxysilane in cyclohexane was prepared. Then the pretreated CM was impregnated with the solution of perfluoro-n-hexyltrimethoxysilane in cyclohexane for 3 h, then taken out, rinsed with ethanol, acetone, and distilled water continuously for 10 min, and then dried in an oven at 70° C. for 6 h to produce CM-FAS.

(3) Preparation of CM-PDA

A 4 g/L DA aqueous solution was prepared, and a pH of the DA aqueous solution was adjusted with a Tris-HCl buffer to about 8.5. Then 2 mL of the DA aqueous solution was taken and evenly coated on a surface of the hydrophobic ceramic membrane with a coated surface facing downwards to prevent the solution from overflowing at an edge of the surface of the membrane. The even coating was required, and the coating on a side or bottom surface should be avoided. A coated surface was observed. 2 mL of the DA aqueous solution was coated once every 10 min to 20 min, and the coating lasted for about 1.5 h. Then a resulting membrane was rinsed with deionized water continuously for 10 min and then dried in a 70° C. oven for 12 h to produce CM-PDA.

(4) Measurement of Surface Chemical States and Surface Wetting States of CM, CM-FAS, and CM-PDA The CM-PDA was used in a membrane-dispersed air-water system. A gas inlet pressure was 0.02 Mpa, which was ten times lower than a gas inlet pressure of the hydrophilic CM. Bubbles passing through CM-PDA had an average size of about 171.9 μm, and the bubbles were small. A dissolved oxygen concentration in an aqueous phase within 3 min was 7.91 mg/L, which was better than a dissolved oxygen concentration of the original hydrophilic CM.

Example 3

(1) Pretreatment of CM

The CM was ultrasonically cleaned for 15 min in ethanol, acetone, and distilled water successively, and then dried in an oven at 80° C. for 16 h to produce pretreated CM.

(2) Preparation of CM-FAS

A solution of 0.005 mol/L perfluorododecyltrimethoxysilane in cyclohexane was prepared. Then the pretreated CM was impregnated with the solution of perfluorododecyltrimethoxysilane in cyclohexane for 3 h, then taken out, rinsed with ethanol, acetone, and distilled water continuously for 15 min, and then dried in an oven at 80° C. for 8 h to produce CM-FAS.

(3) Preparation of CM-PDA

A 4 g/L DA aqueous solution was prepared, and a pH of the DA aqueous solution was adjusted with a Tris-HCl buffer to about 8.5. Then the prepared CM-FAS was immersed in the DA aqueous solution with one side immersed and the other side exposed to allow deposition for 1.5 h, then taken out, rinsed with deionized water continuously for 15 min, and then dried in an 80° C. oven for 16 h to produce CM-PDA, where a depth for the immersing was not limited.

(4) Measurement of Surface Chemical States and Surface Wetting States of CM, CM-FAS, and CM-PDA The CM-PDA was used in a membrane-dispersed air-water system. A gas inlet pressure was 0.02 Mpa, which was ten times lower than a gas inlet pressure of the hydrophilic CM. Bubbles passing through CM-PDA had an average size of about 164.2 μm, and the bubbles were small. A dissolved oxygen concentration in an aqueous phase within 3 min was 7.93 mg/L, which was better than a dissolved oxygen concentration of the original hydrophilic CM.

Comparative Example 1

The CM was ultrasonically cleaned for 10 min in ethanol, acetone, and distilled water successively, and then dried in an oven at 70° C. for 12 h to produce pretreated CM.

The CM was used in a membrane-dispersed air-water system. A gas inlet pressure was 0.2 Mpa, which increased. Bubbles passing through CM had an average size of about 97.8 μm. A dissolved oxygen concentration in an aqueous phase within 3 min was 7.01 mg/L, which was lower than a dissolved oxygen concentration of CM-PDA prepared under the optimal conditions.

Comparative Example 2

(1) Pretreatment of CM

The CM was ultrasonically cleaned for 15 min in ethanol, acetone, and distilled water successively, and then dried in an oven at 80° C. for 16 h to produce pretreated CM.

(2) Preparation of CM-FAS

A solution of 0.005 mol/L tridecafluoro-n-octyltrimethoxysilane in cyclohexane was prepared. Then the pretreated CM was impregnated with the solution of tridecafluoro-n-octyltrimethoxysilane in cyclohexane for 3 h, then taken out, rinsed with ethanol, acetone, and distilled water continuously for 15 min, and then dried in an oven at 80° C. for 8 h to produce CM-FAS.

The CM-FAS was used in a membrane-dispersed air-water system. A gas inlet pressure was 0.01 Mpa, which was ten times lower than a gas inlet pressure of the hydrophilic CM. Bubbles passing through CM-FAS had an average size of about 5,405.2 μm, and the size of the bubbles increased. The dispersion was uneven. A dissolved oxygen concentration in an aqueous phase within 3 min was 7.72 mg/L, which was lower than a dissolved oxygen concentration of CM-PDA prepared under the optimal conditions.

Comparative Example 3

This comparative example was the same as Example 1, except that CM-PDA was prepared with a DA aqueous solution at a concentration of 1 g/L and a deposition time of 2 h.

The CM-PDA was used in a membrane-dispersed air-water system. A gas inlet pressure was 0.02 Mpa, which was ten times lower than a gas inlet pressure of the hydrophilic CM. Bubbles passing through CM-PDA had an average size of about 3,573.5 μm, and the size of the bubbles increased. The dispersion was uneven.

Comparative Example 4

This comparative example was the same as Example 1, except that CM-PDA was prepared with a DA aqueous solution at a concentration of 2 g/L and a deposition time of 2 h.

The CM-PDA was used in a membrane-dispersed air-water system. A gas inlet pressure was 0.02 Mpa, which was ten times lower than a gas inlet pressure of the hydrophilic CM. Bubbles passing through CM-PDA had an average size of about 2,829.2 μm, and the size of the bubbles increased. The dispersion was uneven.

Comparative Example 5

This comparative example was the same as Example 1, except that CM-PDA was prepared with a DA aqueous solution at a concentration of 3 g/L and a deposition time of 2 h.

The CM-PDA was used in a membrane-dispersed air-water system. A gas inlet pressure was 0.02 Mpa, which was ten times lower than a gas inlet pressure of the hydrophilic CM. Bubbles passing through CM-PDA had an average size of about 2,315.5 μm, and the size of the bubbles increased. The dispersion was uneven.

Comparative Example 6

This comparative example was the same as Example 1, except that CM-PDA was prepared with a DA aqueous solution at a concentration of 4 g/L and a deposition time of 2 h.

The CM-PDA was used in a membrane-dispersed air-water system. A gas inlet pressure was 0.02 Mpa, which was ten times lower than a gas inlet pressure of the hydrophilic CM. Bubbles passing through CM-PDA had an average size of about 335.1 μm, and the size of the bubbles increased. The dispersion was uneven.

Comparative Example 7

This comparative example was the same as Example 1, except that CM-PDA was prepared with a DA aqueous solution at a concentration of 5 g/L and a deposition time of 2 h.

The CM-PDA was used in a membrane-dispersed air-water system. A gas inlet pressure was 0.02 Mpa, which was ten times lower than a gas inlet pressure of the hydrophilic CM. Bubbles passing through CM-PDA had an average size of about 750.6 μm, and the size of the bubbles increased. The dispersion was uneven.

Comparative Example 8

This comparative example was the same as Example 1, except that CM-PDA was prepared with a DA aqueous solution at a concentration of 6 g/L and a deposition time of 2 h.

The CM-PDA was used in a membrane-dispersed air-water system. A gas inlet pressure was 0.02 Mpa, which was ten times lower than a gas inlet pressure of the hydrophilic CM. Bubbles passing through CM-PDA had an average size of about 1,775.9 μm, and the size of the bubbles increased. The dispersion was uneven.

Comparative Example 9

This comparative example was the same as Example 1, except that CM-PDA was prepared with a DA aqueous solution at a concentration of 4 g/L and a deposition time of 0.5 h.

The CM-PDA was used in a membrane-dispersed air-water system. A gas inlet pressure was 0.02 Mpa, which was ten times lower than a gas inlet pressure of the hydrophilic CM. Bubbles passing through CM-PDA had an average size of about 1,745.4 μm, and the size of the bubbles increased. The dispersion was uneven.

Comparative Example 10

This comparative example was the same as Example 1, except that CM-PDA was prepared with a DA aqueous solution at a concentration of 4 g/L and a deposition time of 1 h.

The CM-PDA was used in a membrane-dispersed air-water system. A gas inlet pressure was 0.02 Mpa, which was ten times lower than a gas inlet pressure of the hydrophilic CM. Bubbles passing through CM-PDA had an average size of about 300.6 μm, and the size of the bubbles increased. The dispersion was uneven.

Comparative Example 11

This comparative example was the same as Example 1, except that CM-PDA was prepared with a DA aqueous solution at a concentration of 4 g/L and a deposition time of 4 h.

The CM-PDA was used in a membrane-dispersed air-water system. A gas inlet pressure was 0.02 Mpa, which was ten times lower than a gas inlet pressure of the hydrophilic CM. Bubbles passing through CM-PDA had an average size of about 402.2 μm, and the size of the bubbles increased. The dispersion was uneven.

Comparative Example 12

This comparative example was the same as Example 1, except that CM-PDA was prepared with a DA aqueous solution at a concentration of 4 g/L and a deposition time of 6 h.

The CM-PDA was used in a membrane-dispersed air-water system. A gas inlet pressure was 0.02 Mpa, which was ten times lower than a gas inlet pressure of the hydrophilic CM. Bubbles passing through CM-PDA had an average size of about 425.5 μm, and the size of the bubbles increased. The dispersion was uneven.

Comparative Example 13

This comparative example was the same as Example 1, except that CM-PDA was prepared with a DA aqueous solution at a concentration of 4 g/L and a deposition time of 8 h.

The CM-PDA was used in a membrane-dispersed air-water system. A gas inlet pressure was 0.02 Mpa, which was ten times lower than a gas inlet pressure of the hydrophilic CM. Bubbles passing through CM-PDA had an average size of about 329.8 μm, and the size of the bubbles increased. The dispersion was uneven.

Comparative Example 14

This comparative example was the same as Example 1, except that CM-PDA was prepared with a DA aqueous solution at a concentration of 4 g/L and a deposition time of 10 h.

The CM-PDA was used in a membrane-dispersed air-water system. A gas inlet pressure was 0.02 Mpa, which was ten times lower than a gas inlet pressure of the hydrophilic CM. Bubbles passing through CM-PDA had an average size of about 768.3 μm, and the size of the bubbles increased. The dispersion was uneven.

The above examples prove that the Janus ceramic membrane provided by the present disclosure can exhibit a prominent mass transfer effect when used in a dispersed air-water system. The comparative examples prove that the Janus ceramic membrane with asymmetric wettability provided by the present disclosure not only has the unique properties of both hydrophilic and hydrophobic ceramic membranes, but also can improve the defects of hydrophilic and hydrophobic ceramic membranes to allow a synergistic effect, which improves the bubble aeration performance in a gas-liquid dispersion process. Compared with the original hydrophilic ceramic membrane, the hydrophobic side of the Janus ceramic membrane can prevent water from penetrating into pores of the membrane and reduce the mass transfer resistance. Compared with the hydrophobic ceramic membrane, the hydrophilic surface not only is conducive to the generation of ultra-fine bubbles, but also can allow the rapid separation of bubbles from a surface of the membrane and improve the mass transfer efficiency. The Janus ceramic membrane prepared by the present disclosure exhibits excellent bubble aeration performance in a membrane-dispersed air-water system.

The above are only preferred examples of the present disclosure, and are not intended to limit the present disclosure in other forms. Any person skilled in the art may change or modify the technical content disclosed above into an equivalent example to be applied in other fields. Any simple modification or equivalent change and modification for the above examples made according to the technical essence of the present disclosure without departing from the content of the technical solution of the present disclosure shall fall within the protection scope of the technical solutions of the present disclosure.

What is claimed is:

1. A method of producing a Janus ceramic membrane for use in a dispersion-intensified bubble aeration process, wherein the Janus ceramic membrane has an asymmetric wettability structure; the Janus ceramic membrane is produced by grafting a hydrophobic group on a substrate membrane in situ through impregnation of a perfluoroalkyl-silane (FAS), and forming a hydrophilic coating through unilateral asymmetric surface deposition of dopamine (DA); comprising the following steps:

step 1, cleaning and oven-drying a sheet ceramic substrate membrane;

step 2, adding the FAS to cyclohexane, and thoroughly mixing to prepare a first solution;

step 3, impregnating an oven-dried substrate membrane in the first solution, cleaning, and oven-drying to produce a hydrophobic ceramic membrane;

step 4, dissolving the DA in deionized water, and adding a Tris-HCl buffer to prepare a second solution; and step 5, placing a single side of the hydrophobic ceramic membrane in the second solution for deposition or coating the second solution evenly on the single side of the hydrophobic ceramic membrane, and cleaning and drying to produce the Janus ceramic membrane, wherein:

in the step 5, the deposition is conducted for 0.5 h to 10 h, the cleaning comprises rinsing with deionized water for 5 min to 15 min, the drying is conducted at 60° C. to 80° C. for 8 h to 16 h, and the FAS is one of: perfluoro-n-hexyltrimethoxysilane, perfluoro-n-octyltrimethoxysilane, and perfluorodo-decyltrimethoxysilane, and wherein the Janus ceramic membrane produced exhibits, when used in a membrane-dispersed air-water system with the hydrophilic surface contacting the liquid phase and the hydrophobic surface contacting the gas phase: (i) a gas inlet pressure to initiate bubbling of about 0.02 MPa and at least ten times lower than that of a hydrophilic Al2O3 substrate membrane, and (ii) an average bubble diameter of about 150 μm to about 180 μm.

2. The method of producing of the Janus membrane according to claim 1, wherein the dispersion-intensified bubble aeration process is to disperse a gas-phase substance in a liquid phase through the Janus ceramic membrane; the Janus ceramic membrane has a sheet structure, and two sides of the sheet structure are a hydrophilic surface and a hydrophobic surface, respectively; and the hydrophilic surface is in contact with the liquid phase, and the hydrophobic surface is in contact with the gas-phase substance.

3. The method of producing of the Janus membrane according to claim 1, wherein in the step 1, the sheet ceramic substrate membrane is an $Al_2O_3$ ceramic membrane, and has a nano-scale pore size; the cleaning is as follows: ultrasonically cleaning for 5 min to 15 min in ethanol, acetone, and distilled water successively; and the oven-drying is conducted at 60° C. to 80° C. for 8 h to 16 h.

4. The method of producing of the Janus membrane according to claim 1, wherein in the step 2, a concentration of the FAS in the first solution is 0.005 mol/L; and in the step 3, the impregnating is conducted for 3 h, the cleaning refers to rinsing with ethanol, acetone, and distilled water successively for 5 min to 15 min in total, and the oven-drying is conducted at 60° C. to 80° C. for 4 h to 8 h.

5. The method of producing of the Janus membrane according to claim 1, wherein in the step 4, a concentration of the DA in the second solution is 1 g/L to 6 g/L, and the second solution has a pH of 8.4 to 8.6.

\* \* \* \* \*